United States Patent
Nagaike et al.

(10) Patent No.: US 6,239,207 B1
(45) Date of Patent: May 29, 2001

(54) ACTIVE-METHYLENE FUNCTIONALIZED LATEX POLYMER PREPARED IN THE PRESENCE OF A HYDROPHILIC ISOPRENE SULFURIC ACID POLYMER, AND SHEET MATERIAL COMPRISING SAME

(75) Inventors: Chiaki Nagaike; Eiichi Ueda; Nobuo Kubo, all of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/189,307

(22) Filed: Nov. 10, 1998

(30) Foreign Application Priority Data

Nov. 13, 1997 (JP) .................................................... 9-311926

(51) Int. Cl.[7] .......................... B32B 25/08; B32B 27/31; C08F 220/26; C08L 19/02; G03C 1/053
(52) U.S. Cl. .......................... 524/458; 524/555; 430/536; 526/201; 526/298; 526/312; 526/315; 526/316
(58) Field of Search ..................................... 524/458, 555; 430/536; 526/201, 298, 312, 315, 316

(56) References Cited

U.S. PATENT DOCUMENTS

| 4,935,338 | * | 6/1990 | Masuda et al. | 430/631 |
| 5,182,343 | * | 1/1993 | Ono et al. | 526/240 |
| 5,705,329 | * | 1/1998 | Nakajima et al. | 430/536 |

FOREIGN PATENT DOCUMENTS

09052976  *  2/1997  (JP) ............................... C08K/5/42

* cited by examiner

Primary Examiner—David W. Wu
Assistant Examiner—K C Egwim
(74) Attorney, Agent, or Firm—Jordan B. Bierman; Bierman, Muserlian and Lucas

(57) ABSTRACT

A latex is prepared by polymerizing a polymerizable monomer having an active methylene group in the presence of a hydrophilic polymer. The hydrophilic polymer comprises an isoprene sulfonic acid or salts thereof as a monomer unit. A sheet material is prepared having a support with a hydrophilic layer containing the latex thereon.

14 Claims, No Drawings

ACTIVE-METHYLENE FUNCTIONALIZED LATEX POLYMER PREPARED IN THE PRESENCE OF A HYDROPHILIC ISOPRENE SULFURIC ACID POLYMER, AND SHEET MATERIAL COMPRISING SAME

FIELD OF THE INVENTION

The present invention relates to a latex and a sheet material comprising a hydrophilic colloidal layer using the same, which exhibits improvement in the physical properties of layers.

BACKGROUND OF THE INVENTION

In conventional silver halide light-sensitive photographic material, gelatin is widely employed as a binder.

Gelatin exhibits high swelling and gelling capabilities and is easily subjected to cross linking reaction employing various types of hardening agents. In addition, gelatin is a binder which exhibits extremely excellent properties to uniformly coat, over a wide area, a material such as light-sensitive silver halide which is to be protected from high temperatures by adjusting the physical properties of the coating composition.

On the other hand, a technique is known in which the layer physical properties of the light-sensitive material are improved by incorporating a polymer latex comprising a cross linking group with gelatin into a silver halide emulsion layer. However, the latex prepared by copolymerization with the monomer having such cross linking group exhibits low polymerization stability and low compatibility with gelatin. Accordingly, improved effects due to the cross linking group have not been fully exhibited.

SUMMARY OF THE INVENTION

Accordingly, an object of the present invention is to provide a latex and a sheet material using the same, which exhibits excellent physical properties of the layers, especially, strength of layers on the support at wet state, high flexibility of swelled layers on the support.

The present invention will now be described.

The latex of the present invention is prepared by polymerizing a polymerizable monomer having an active methylene group in the presence of a hydrophilic copolymer comprising isoprene sulfonic acid or salts thereof as a monomer unit.

A sheet material is comprised of a support having thereon at least one hydrophilic colloidal layer which is provided by coating composition containing the above-mentioned latex and drying.

In the sheet material mentioned above solid portion of the latex is preferably 1 to 50 percent in terms of weight ratio for the whole hydrophilic colloidal layer.

DETAILED DESCRIPTION OF THE INVENTION

The present invention is explained in detail below.

The latex is prepared by copolymerising a polymerizable monomer having an active methylene group in the presence of a hydrophilic copolymer comprising isoprene sulfonic acid or salts thereof as a monomer unit.

The polymerizing is conducted by means of usual way.

The hydrophilic copolymer used for preparation of the latex preferably comprises a water solubilising group such as a sulfonic acid-base, carboxylic acid-base or an acid neutralized group of amine group, and in a certain case, comprises another functional group forming bridge such as a group having an unsaturated double bond.

It is preferably contains unit of isoprene sulfonic acid or salts thereof not less than 30 molar %, more preferably not less than 50 molar %, in the polymer.

Examples of the hydrophilic copolymer are illustrated below.

P-1

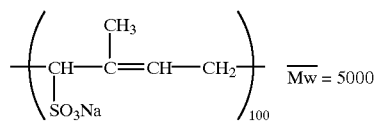

P-2

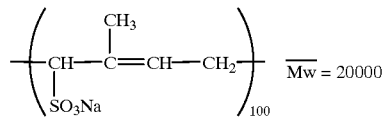

P-3

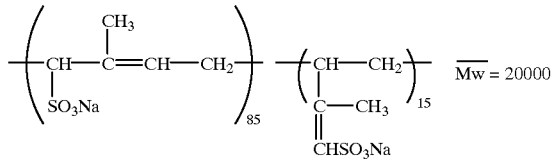

P-4

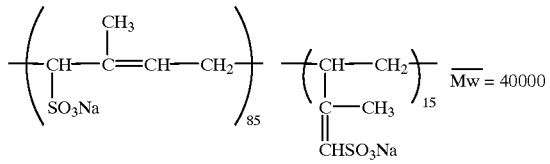

-continued
P-5
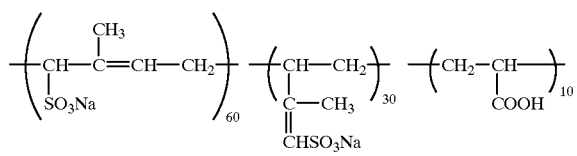
$\overline{Mw} = 30000$
P-6
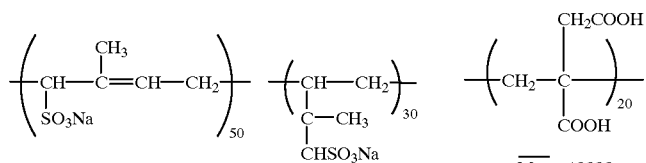
$\overline{Mw} = 10000$
(composition ratio: mole percent)
P-7
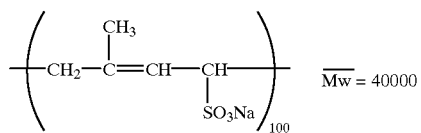 $\overline{Mw} = 40000$
P-8
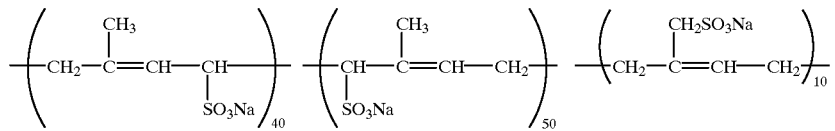
$\overline{Mw} = 40000$
P-9
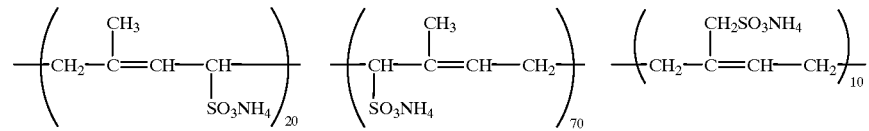
$\overline{Mw} = 40000$
P-10
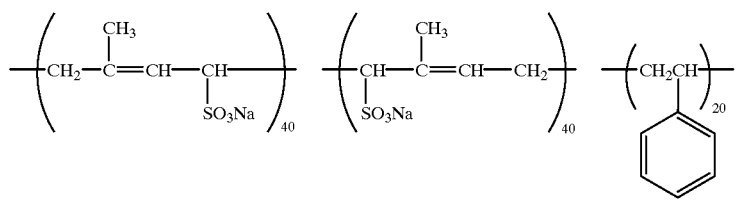
$\overline{Mw} = 40000$
P-11
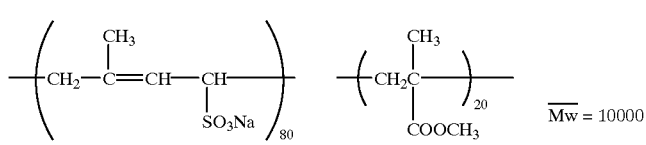 $\overline{Mw} = 10000$
P-12
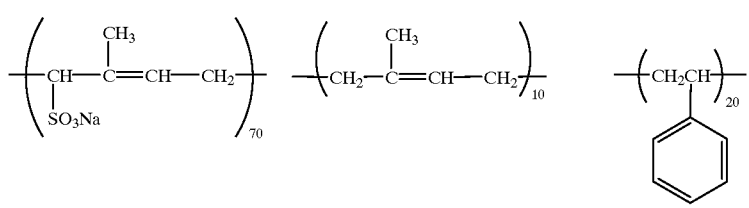
$\overline{Mw} = 40000$ The hydrophilic polymer is preferably soluble not less than 1 g in 100 ml of water at room temperature.

The molecular weight of the hydrophilic polymer is preferably 3,000–200,000, more preferably 10,000–100,000 in terms of weight average molecular weight.

Polymerizable monomers having an active methylene group is explained.

The active methylene monomers which are preferably employed in the present invention are compounds represented by the general formula (1) described below.

General formula (1)

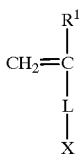

wherein $R^1$ represents a hydrogen atom, an alkyl group having from 1 to 4 carbon atoms (for example, each of a methyl, ethyl, n-propyl, n-butyl group, etc.), or a halogen atom (for example, a chlorine atom, a bromine atom), and preferably represents a hydrogen atom, a methyl group, and a chlorine atom, and L represents a single bond or divalent linkage group. Specifically, the latter are represented by the following formula.

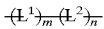

wherein $L^1$ represents —CON($R^2$)— ($R^2$ represents a hydrogen atom, an alkyl group having from 1 to 4 carbon atoms, or a substituted alkyl group having from 1 to 6 carbon atoms), —COO—, —NHCO—, —OCO—,

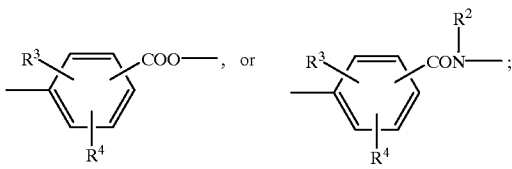

wherein $R^3$ and $R^4$ each independently represents a hydrogen atom, a hydroxyl group, a halogen atoms, a substituted or unsubstituted alkyl, alkoxy, or aryloxy group;

$L^2$ represents a linkage group to link $L^1$ with X, and m represents 0 or 1; and n represents 0 or 1. The linkage groups represented by $L^2$ are specifically represented by the general formula (2) described below.

General formula (2)

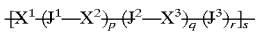

wherein $J^1$, $J^2$, and $J^3$ are the same or different and each represents —CO—, —SO$_2$—, —CON($R^5$)— ($R^5$ represents a hydrogen atom, an alkyl group having from 1 to 6 carbon atoms), a substituted alkyl group having from 1 to 6 carbon atoms), —SO$_2$N($R^5$) ($R^5$ is the same as above), —N($R^5$)—$R^6$— ($R^5$ is the same as above, and $R^6$ represents an alkylene group having from 1 to 4 carbon atoms), —N($R^5$)—$R^6$—N($R^7$)— ($R^5$ and $R^6$ are the same as above, $R^7$ represents a hydrogen atom, an alkyl group having from 1 to 6 carbon atoms), a substituted alkyl group having from 1 to 6 carbon atoms), —O—, —S—, —N($R^5$)—CO—N($R^7$)— ($R^5$ and $R^7$ are the same as above), —N($R^5$)—SO$_2$—N ($R^7$)— ($R^5$ and $R^7$ are the same as above), —COO—, —OCO—, —N($R^5$)CO— ($R^5$ is the same as above), —N($R^5$)CO— ($R^5$ is the same as above), etc.

p, q, r, and s each represents 0 or 1.

$X^1$, $X^2$, and $X^3$ may be the same or different, and each represents an alkylene group having from 1 to 10 carbon atoms, an alalkylene group or a phenylene group, each of which group may be substituted or unsubstituted, and the alkylene group may be a straight or branched chain. As the alalkylene groups, can be listed, for example, each of a methylene, methylmethylene, dimethylmethylene, dimethylene, trimethylene, tetramethylene, pentamethylene, hexamethylene, decylmethylene group, etc. As the alalkylene groups, can be listed, for example, each of a D-phenylene, m-phenylene, methylphenylene group, etc.

X represents a monovalent group comprising an active methylene group. As specific preferred examples, can be listed $R^8$—CO—CH$_2$—COO—, NC—CH$_2$—COO—, $R^8$—CO—CH$_2$—CO—, $R^8$—CO—CH$_2$—CON($R^5$)—, etc., wherein $R^5$ is the same as described above, $R^8$ represents a substituted or unsubstituted alkyl group (for example, a methyl, ethyl, n-propyl, n-butyl, t-butyl, n-nonyl, 2-methoxyethyl, 4-phenoxybutyl, benzyl, 2-methanesulfonamidoethyl group, etc.), a substituted or unsubstituted aryl group (for example, each of a phenyl, p-methylphenyl, p-methoxyphenyl, p-chlorophenyl group, etc.), an alkoxy group (for example, each of a methoxy, ethoxy, methoxyethoxy, n-butoxy group, etc.), a cycloalkyloxy group (for example, a cyclohexyloxy group, etc.), an aryloxy group (for example, each of a phenoxy, D-methylphenoxy, o-chlorophenoxy, p-cyanophenoxy group, etc.), an amino group, a substituted amino group (for example, each of a methylamino, ethylamino, dimethylamino, butylamino group, etc.).

Following are exemplified polymerizable monomers having an active methylene group of the present invention.

M-1 2-acetoacetoxyethylmethacrylate
M-2 2-acetoacetoxyethylacrylate
M-3 2-acetoacetoxypropylmethacrylate
M-4 2-acetoacetoxypropylacrylate
M-5 2-acetoacetamidoethylmethacrylate
M-6 2-acetoacetamidoethylacrylate
M-7 2-cyanoacetoxyethylmethacrylate
M-8 2-cyanoacetoxyethylacrylate
M-9 N-2(cyanoacetoxyethyl)acrylate
M-10 2-propionylacetoxyethylacrylate
M-11 N(2-propionylacetoxyethyl)methacrylamide
M-12 N-4-(acetoxybenzyl)phenylacrylamide
M-13 ethylacryloylacetate
M-14 acryloylmethylacetate
M-15 N-methacryloyloxymethylacetoacetamide
M-16 ethylmethacryloylacetoacetate
M-17 N-allylcyanoacetamide
M-18 methylacryloylacetoacetate
M-19 N-(2-methacryloxymethyl)cyanoacetamide
M-20 p-(2-acetoacetyl)ethylstyrene
M-21 4-acetoacetyl-1-methacryloylpoperazine
M-22 ethyl-α-acetoacetoxymethacrylate
M-23 N-butyl-N-acryloyloxyethylacetoacetamide
M-24 p-(2-acetoacetoxy)ethylstyrene Among the above, M-1 and M-2 are especially preferable.

As copolymerizable monomers used with a polymerizable monomer having an active methylene group, can be listed compounds having a vinyl group, for example, acrylic acid esters such as methylacrylate, ethylacrylate, butylacrylate, cyclohexylacrylate, etc., vinyl esters such as vinyl acetate, vinyl propionate, etc., vinyl ethers such as methyl vinyl ether, butyl vinyl ether, etc., vinyl ketones such as methyl vinyl ketone, ethyl vinyl ketone, etc., styrenes such as styrene, methylstyrene, chloromethylstyrene, etc., acrylonitrile, vinyl chloride, vinylidene chloride, butadiene, isoprene, etc.

The preferred copolymerization ratio of the polymerizable monomer having an active methylene group to the copolymerizable monomer is preferably not less than 3 weight percent of the former, and more preferably between 5 and 30 weight percent.

A polymerization initiator may be utilized for the preparation of the latex of the invention. Examples include potassium persulfate, sodium persulfate, ammonium persulfate, hydrogen peroxide, 4,4'-azobis-4-cyanovaleric acid, 2,2'-azobis(2-methylamidoxime)dihydrochloride. The initiator may be used one or more.

The hydrophilic polymer used for preparation of the latex also works as a dispersing agent. A dispersing agent may be used in addition thereto, example of which includes low molecular surfactant such as anionic surfactant, cationic surfactant and nonionic surfactant.

Amount of the hydrophilic polymer used for preparation of the latex is preferably 0.5–20 weight parts, and more preferably 10–30 weight parts to 100 parts of monomer having an active methylene group.

Particle size of latex is 0.05–0.5$\mu$m in terms of number average size.

The synthesized latex preferably contains solid particles of 5–40 wt %.

A sheet material comprises a support having thereon a hydrophilic colloidal layer. The hydrophilic colloidal layer is provided by coating the composition containing the latex and other hydrophilic colloid, whose example includes gelatin, gelatin derivatives, hydrophilic synthesized polymer such as polyvinylalcohol. These other hydrophilic colloids may be referred to a binder. The latex polymer particle works as a hardening agent. While usual hardening agent immigrate between layers when the layers are coated as water containing composition, the latex polymer particle does not immigrate in such instance.

The sheet material comprises a latex prepared by polymerization, employing a polymerizable monomer, having an active methylene group, in the presence of a hydrophilic polymer having isoprene sulfonic acid or salts thereof as a monomer unit in the above-mentioned hydrophilic colloidal layer.

In terms of weight ratio, the weight of the solid part of the latex is preferably 1 to 50 weight percent, preferably 1 to 40 weight percent of the whole hydrophilic colloid layer including latex polymer. The most preferable ratio of the solid part of the latex in the hydrophilic layer is 10 to 30 weight percent.

The latex is preferred which is prepared by polymerization employing the above-mentioned polymerizable monomer having an active methylene group in the presence of a hydrophilic polymer having the above-mentioned isoprene sulfonic acid or salts thereof as a monomer unit, and as the polymerizable monomers, the above-mentioned M-1 through M-24 can be listed.

A plurality of types of latexes may also be employed in combination.

The latexes of the present invention are suitable for a sheet material, specifically a silver halide light-sensitive photographic material.

(Latex Preparation Example-1)

Into a 1-liter flask, 360 ml of distilled water, degassed with $N_2$ gas, and 5 g of hydrophilic polymer P-10 were placed and were heated to 80° C. To the resulting mixture, 1.5 g of ammonium persulfate, dissolved in 5 ml of distilled water, was quickly added; a mixture of M-1, cyclohexylmethacrylate, isononylacrylate, and glycidylmethacrylate was added dropwise to the resulting mixture for about one hour; and after the dripping addition, the resulting mixture was stirred for 3 hours. Thereafter, 0.5 g of ammonium persulfate was added and the resulting mixture was stirred for 2 hours. After cooling to room temperature, the pH was adjusted to 6.0 employing ammonia, and the desired Latex A was prepared, with average particle diameter of the resulting latex of 0.16 $\mu$m.

(Preparation Examples of Latexes B through K, and a through d)

Samples were prepared in the same manner as in the latex preparation of Example 1, except that the types and amounts of employed hydrophilic polymers, polymerizable monomers having an active methylene group and copolymerizable monomers were changed as shown in Table 1.

The latexes are shown in the table below.

TABLE 1

| | Latex Type | Hydrophilic Polymer | | Active Methylene Monomer | | Copolymerizable Monomer | |
|---|---|---|---|---|---|---|---|
| | | Type | Weight (g) | Type | Weight (g) | Type | Weight (g) |
| Present Invention | A | P-10 | 5 | M-1 | 10 | cyclohexylacrylate<br>isononylmethacrylate<br>glycidylmethacrylate | 54<br>27<br>9 |
| Present Invention | B | P-11 | 5 | M-1 | 20 | cyclohexylacrylate<br>isononylacrylate<br>glycidylmethacrylate | 47<br>25<br>8 |
| Present Invention | C | P-10 | 5 | M-1 | 25 | styrene<br>acrylic acid | 74.5<br>0.5 |
| Present Invention | D | P-12 | 5 | M-1 | 10 | styrene<br>acrylic acid | 89.5<br>0.5 |
| Present Invention | E | P-10 | 5 | M-2 | 10 | vinyl acetate<br>vinyl pivaliate | 45<br>45 |
| Present Invention | F | P-10<br>P-12 | 5<br>5 | M-2 | 10 | styrene<br>vinyl acetate | 45<br>45 |
| Present | G | P-12 | 5 | M-2 | 25 | cyclohexylacrylate | 65 |

TABLE 1-continued

| | Latex Type | Hydrophilic Polymer Type | Weight (g) | Active Methylene Monomer Type | Weight (g) | Copolymerizable Monomer Type | Weight (g) |
|---|---|---|---|---|---|---|---|
| Invention | | | | | | glycidylmethacrylate | 10 |
| Comparative | a | P-11 | | | | cyclohexylacrylate | 55 |
| | | | | | | isononylacrylate | 35 |
| | | | | | | glycidylacrylate | 10 |
| Comparative | b | P-10 | | | | vinyl acetate | 50 |
| | | P-11 | | | | styrene | 50 |
| Comparative | c | P-12 | | | | cyclohexylacrylate | 75 |
| | | | | | | glycidylacrylate | 75 |
| Comparative | d | none | | | | vinyl acetate | 50 |
| | | Note | | | | vinyl pivaliate | 50 |

Note:
5 g of sodium lauryl sulfate, a low molecular weight surface active agent, was employed.

EXAMPLES

The present invention is explained with reference to the following examples.

Example 1

<Preparation of Emulsion Em-1>

Emulsion Em-1 comprised of tabular silver iodobromide rains was prepared in the manner described below.

| (A1 Composition) | |
|---|---|
| Ossein gelatin | 24.2 g |
| Water | 9657 ml |
| HO(CH$_2$CH$_2$O)$_n$[CH(CH$_3$)CH$_2$O]$_{17}$(CH$_2$CH$_2$O)$_m$H (n + m = 5 to 7) 10% methanol solution | 1.20 ml |
| Potassium bromide | 10.8 g |
| 10% nitric acid | 160 ml |
| (B1 Composition) | |
| 2.5 N aqueous silver nitrate solution | 2825 ml |
| (C1 Composition) | |
| Potassium bromide | 841 g |
| Water to make | 2825 ml |
| (D1 Composition) | |
| Ossein gelatin | 121 g |
| Water | 2040 ml |
| HO(CH$_2$CH$_2$O)$_n$[CH(CH$_3$)CH$_2$O]$_{17}$(CH$_2$CH$_2$O)$_m$H (n + m = 5 to 7) 10% methanol solution | 5.70 ml |
| (E1 Composition) | |
| Aqueous 1.75 N potassium bromide solution amount to adjust silver potential | |

Nucleus formation was carried out by adding 475.0 ml each of B1 Composition and C1 Composition to A1 Composition at 35° C. for two minutes employing a double-jet method, while employing a mix-stirring machine described in Japanese Patent Publication 58-58288.

After the addition of B1 Composition and C1 Composition, A1 Composition was heated to 60° C. over 60 minutes, and all D1 composition was added and the pH was adjusted to 5.5 employing an aqueous 3% potassium hydroxide solution. Thereafter, 55.4 ml of B1 Composition and 55.4 ml of C1 composition were again added at a flow rate of 4 ml/minute for 42 minutes. During the preparation, silver potential (measured by a silver ion selective electrode employing a saturated silver-silver chloride electrode as a reference electrode) was adjusted to +8 mV and +30 mV.

After the addition, the pH was adjusted to 6.0 employing an aqueous 3% potassium hydroxide solution. Thereafter, water-soluble salts were immediately removed and washed to obtain a seed emulsion. The resulting seed emulsion was observed employing an electron microscope and was found that not less than 90 percent of the total projection area of silver halide grains was composed of hexagonal tabular grains having a maximum adjacent side ratio of 1.0 to 2.0, and the average thickness of the hexagonal tabular grains and average diameter corresponding to a circle thereof were 0.090 μm and 0.510 μm, respectively.

To the resulting seed emulsion, heated to 53° C., 450 mg of spectral sensitizing dye A (sodium 5,5'-dichloro-9-ethyl-3,3'-di-(3-sulfopropyl)oxacarbocyanine salt anhydride and 8 mg of spectral sensitizing dye B (sodium 5,5'-di-(butoxycarbonyl-1,1'-di-ethyl-3,3'-di-(4-sulfobutyl) benzimidazolocarbocyanine anhydride) were added in the form of a solid particle dispersion. Thereafter, the resulting emulsion was added with an aqueous solution containing 60 mg of 4-hydroxy-6-methyl-1,3,3a,7-tetraazaindne (TAI), 15 mg of adenine, 50 mg of ammonium thiocyanate, 2.5 mg of chloroauric acid, and 5.0 mg of sodium thiosulfate, 5 milli moles of a fine silver iodide grain emulsion (average grain size of 0.05 μm), and a dispersion containing 6.0 mg of triphenylphosphine selenide, and was then subjected to ripening for a total time of 2 hours and 30 minutes. After ripening, 750 mg of TAI was added as a stabilizer.

Further, the fine solid particle dispersion of the spectral sensitizing dye was prepared by adding the dye to water at 27° C. and stirring the mixture employing a high speed stirrer (dissolver) at 3500 r.p.m. for 30 to 120 minutes. The triphenylphosphine selenide dispersion was also prepared by adding 120 g of triphenylphophine selenide to 30 kg of ethyl acetate at 50° C. followed by total dissolution by stirring. Alternately, 3.8 kg of gelatin was dissolved in 38 kg of deionized water and the resulting solution was added to 93 g of an aqueous 25 weight percent sodium dodecylbenzenesulfonate solution. Thereafter, these two solutions were mixed and were dispersed at 50° C. for 30 minutes at a peripheral speed of 40 m/second of a homogenizing wing employing a high speed stirring type homogenizer having a dissolver with a diameter of 10 cm. Thereafter, the resulting dispersion was immediately subjected to reduced pressure to remove ethyl acetate with stirring until the residual ethyl acetate concentration became not more than 3 weight percent and was then diluted with deionized water to make 80 kg.

<Preparation of Emulsion Em-2>

Emulsion Em-2 composed of tabular silver iodobromide grains was prepared employing Emulsion Em-1 as the seed emulsion and compositions described below.

| (A2 Composition) | |
|---|---|
| Ossein gelatin | 19.04 g |
| HO(CH$_2$CH$_2$O)$_n$[CH(CH$_3$)CH$_2$O]$_{17}$(CH$_2$CH$_2$O)$_m$H (n + m = 5 to 7) 10% methanol solution | 2.00 ml |
| Potassium iodide | 7.00 g |
| Em-1 | equivalent to 1.55 moles |
| Water to make | 2800 ml |
| (B2 Composition) | |
| Potassium bromide | 1493 g |
| Water to make | 3585 ml |
| (C2 Composition) | |
| Silver nitrate | 2131 g |
| Water to make | 3585 ml |
| (D2 Composition) | |
| Fine grain emulsion (*) composed of 3 weight percent gelatin and fine silver iodide grains (average grain diameter of 0.05 μm) | equivalent to 0.028 mole |

*Added for 10 minutes to 6.64 liters of an aqueous 5.0 weight percent gelatin solution, were 2 liters of both two aqueous solutions, one containing 7.06 moles of silver nitrate and the other 7.06 moles of potassium iodide in terms of weight ratio.

The pH during fine grain formation was adjusted to 2.0 employing nitric acid and the temperature was regulated to 40° C. After the grain formation, the pH was adjusted to 6.0 employing an aqueous sodium carbonate solution.

In a reaction vessel, A2 Composition, maintained at 55° C. under vigorous stirring, was added with one half the previous amount of each of B2 Composition and C2 Composition for 35 minutes employing a double-jet method. During the procedure, the pH was maintained at 5.8. The pH was then adjusted to 8.8 employing an aqueous 1% potassium hydroxide solution and B2 Composition and D2 Composition were added employing a double-jet method as long as D2 Composition lasted. The pH was adjusted to 6.0 employing an aqueous 0.3% citric acid solution, and residual B2 Composition and C2 Composition were added for 25 minutes employing the double-jet method. During that time, the pAg was maintained at 8.9. Further, the addition rates of B2 Composition and C2 Composition were functionally varied in accordance to the critical growth rate, and the generation of small grains and multidispersion due to the Ostwald ripening were minimized.

After the addition, the resulting emulsion was subjected to salt removal, washing, and redispersion in the same manner as Em-1. After the redispersion, the pH and pAg were adjusted to 5.80 and 8.2, respectively.

The resulting silver halide emulsion was observed employing an electron microscope and was found to be an emulsion comprised of tabular silver halide grains having an average diameter corresponding to a circle of 0.91 μm, an average thickness of 0.23 μm, an aspect ratio of 4.0, and a grain size distribution width ((standard deviation of grain diameter distribution/average grain diameter)×100) of 20.5%.

To the resulting emulsion heated to 47° C., were added 5 milli moles of a fine silver iodide grain emulsion (average grain diameter of 0.05 μm), and 390 mg of spectral sensitizing dye A and 4 mg of spectral sensitizing dye B, both in the form of solid particle dispersion. Thereafter, the resulting emulsion was added with an aqueous solution containing 10 mg of adenine, 50 mg of ammonium thiocyanate, 2.0 mg of chloroauric acid, and 3.3 mg of sodium thiosulfate, a dispersion containing 4.0 mg of triphenylphosphine selenide, and the resulting emulsion was then subjected to ripening for the total of 2 hours and 30 minutes. After ripening, 750 mg of TAI was added as a stabilizer.

In accordance with the formulas described below, Samples were prepared employing an emulsion prepared by mixing the resulting Em-1 and Em-2 at a 6:4 weight ratio.

<Sample Preparation>

Sample No. 1 was prepared by coating, onto both sides of a 175 μm thick polyethylene terephthalate film base blue tinted at a density of 0.15, a crossover cut layer, an emulsion layer, an interlayer, and a protective layer in this order, employing the following formulas (per side) so that in terms of the weight of single side coating, coated silver was 1.8 g/m$^2$, the coated gelatin of the protective layer was 0.4 g/m$^2$, the coated gelatin of the interlayer was 0.4 g/m$^2$, the coated gelatin of the emulsion layer was 1.5 g/m$^2$, and the coated gelatin of the crossover cut layer was 0.2 g/m$^2$, followed by drying the resulting coating.

| First layer (crossover cut layer) | |
|---|---|
| Fine solid particle dispersion dye AH | 180 mg/m$^2$ |
| Gelatin | 0.2 g/m$^2$ |
| Sodium dodecylbenzenesulfonate | 5 mg/m$^2$ |
| Compound I | 5 mg/m$^2$ |
| Latex L | 0.2 g/m$^2$ |
| Sodium 2,4-dichloro-6-hydroxy-1,3,5-triazine salt | 5 mg/m$^2$ |
| Colloidal silica (average particle diameter of 0.014 μm) | 10 mg/m$^2$ |
| Hardener A | 2 mg/m$^2$ |
| Second layer (emulsion layer) | |
| Gelatin | 0.3 g/m$^2$ |
| Silver halide emulsion    silver weight | 1.8 g/m$^2$ |
| Compound G | 0.5 mg/m$^2$ |
| 2,6-Bis(hydroxyamino)-4-diethylamino 1,3,5-triazine | 5 mg/m$^2$ |
| t-Butylcatechol | 130 mg/m$^2$ |
| Polyvinylpyrrolidone (average molecular weight of 10,000) | 35 mg/m$^2$ |
| Styrene-maleic anhydride copolymer | 80 mg/m$^2$ |
| Sodium polystyrenesulfonate | 80 mg/m$^2$ |
| Trimethylolpropane | 350 mg/m$^2$ |
| Diethylene glycol | 50 mg/m$^2$ |
| Nitrophenyl-triphenyl-phophonium chloride | 20 mg/m$^2$ |
| Ammonium 1,3-dihydroxybenzene-4-sulfonate | 500 mg/m$^2$ |
| Sodium 2-Mercaptobenzimidazole-5-sulfonate | 5 mg/m$^2$ |
| Compound H | 0.5 mg/m$^2$ |
| n-C$_4$H$_9$OCH$_2$CH(OH)CH$_2$N(CH$_2$COOH)$_2$ | 350 mg/m$^2$ |
| Compound M | 5 mg/m$^2$ |
| Compound N | 5 mg/m$^2$ |
| Colloidal silica | 0.5 g/m$^2$ |
| Latex L | 0.2 g/m$^2$ |
| Dextran (average molecular weight of 1,000) | 0.2 g/m$^2$ |
| Compound P | 0.2 g/m$^2$ |
| Compound Q | 0.2 g/m$^2$ |
| Third layer (interlayer) | |
| Gelatin | 0.4 g/m$^2$ |
| Formaldehyde | 10 mg/m$^2$ |
| Sodium 2,4-dichloro-6-hydroxy-1,3,5-triazine salt | 5 mg/m$^2$ |
| Bis-vinylsulfonyl methyl ether | 18 mg/m$^2$ |
| Latex L | 0.05 g/m$^2$ |
| Sodium polyacrylate | 10 mg/m$^2$ |
| Compound S-1 | 3 mg/m$^2$ |
| Compound K | 5 mg/m$^2$ |
| Hardener B | 1 mg/m$^2$ |

-continued

| Fourth layer (protective layer) | |
|---|---|
| Gelatin | 0.4 mg/m² |
| Matting agent (polymethylmethacrylate with an area average particle diameter of 7.0 μm) | 50 mg/m² |
| Formaldehyde | 10 mg/m² |
| Sodium 2,4-dichloro-6-hydroxy-1,3,5-triazine salt | 5 mg/m² |
| Bis-vinylsulfonyl methyl ether | 18 mg/m² |
| Latex L | 0.1 g/m² |
| Polyacrylamide (average molecular weight of 10,000) | 0.05 g/m² |

-continued

| Sodium polyacrylate | 20 mg/m² |
|---|---|
| Polysiloxane SI | 20 mg/m² |
| Compound I | 12 mg/m² |
| Compound J | 2 mg/m² |
| Compound S-1 | 7 mg/m² |
| Compound K | 15 mg/m² |
| Compound O | 50 mg/m² |
| Compound S-2 | 5 mg/m² |
| $C_9F_{19}O(CH_2CH_2O)_{11}H$ | 3 mg/m² |
| $C_8F_{17}SO_2N(C_3H_7)\text{--}(CH_2CH_2O)_{15}H$ | 2 mg/m² |
| $C_8F_{17}SO_2N(C_3H_7)\text{--}(CH_2CH_2O)_4\text{--}(CH_2)_4SO_3Na$ | 1 mg/m² |
| Hardener B | 1.5 mg/m² |

Fine solid particle dispersion dye AH

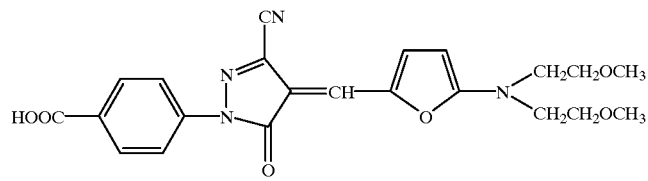

Compound I

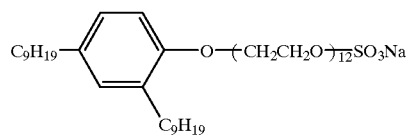

Latex L

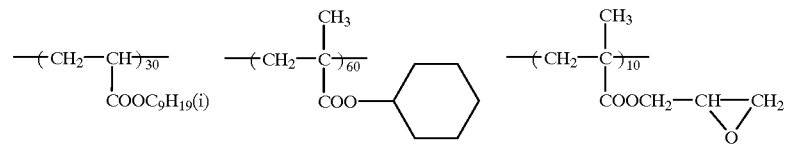

Hardener A

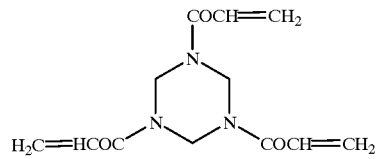

Compound G (right)

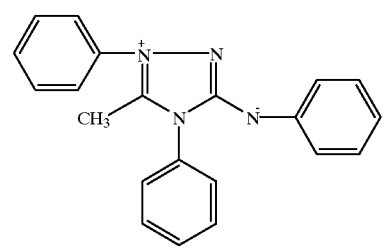

Compound M

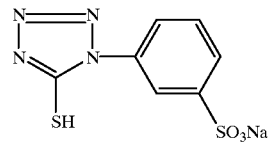

Compound H

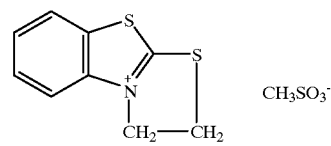

-continued

Compound N

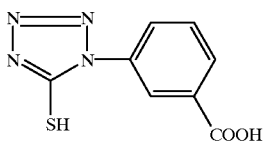

Compound Q

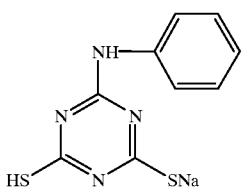

Compound K

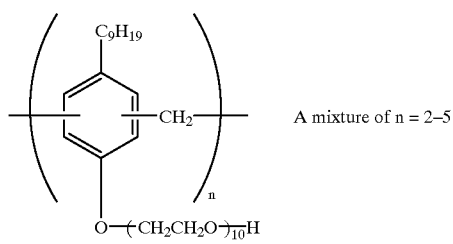

Polysiloxane SI

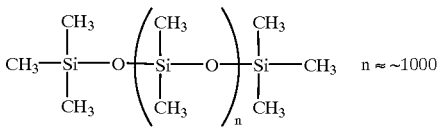

Compound O

$C_{11}H_{23}CONH(CH_2CH_2O)_5H$

Compound P

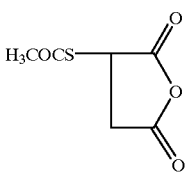

Compound S-1

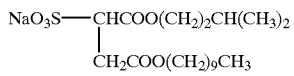

Hardener B

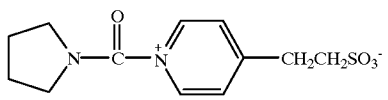

Compound J

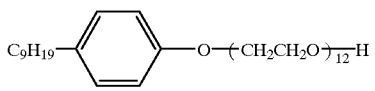

Compound S-2

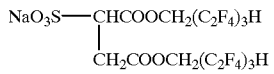

As is shown in Table 2, Samples No. 2 through No. 14 were prepared in the same manner as No. 1, except that the latex type, the added layer, and the added amount were varied.

| (Preparation of Fluorescent Screen) | |
|---|---|
| $Gd_2O_2S$ : Tb fluorescent material (average particle diameter of 1.8 μm) | 200 g |
| Polyurethane series thermoplastic elastomer (Demoratic TPKL-5-2625 (40% solid portion) manufactured by Sumitomo Bayer Co., Ltd.) | 20 g |
| Nitrocellulose (11.5% slaking degree) | 2 g |

Methyl ethyl ketone as a solvent was added to the above-mentioned composition and the resulting mixture was dispersed employing a propeller mixer, to prepare a fluorescent material layer forming coating composition (binder/fluorescent material=1/22).

Furthermore, as a subbing layer forming coating composition, 90 g (solid portion) of soft acrylic resin and 50 g of nitrocellulose were added along with methyl ethyl ketone, dispersed, and mixed to prepare a dispersion having a viscosity of 3 to 6 cps (at 25° C.).

A polyethylene terephthalate film support, into which titanium dioxide was kneaded, was placed on a horizontal glass plate, and the subbing layer forming coating composition was uniformly coated employing a doctor blade. Thereafter, the resulting coating was dried by gradually elevating the temperature from 25° C. to 100° C. to form a subbing layer at a thickness of 15 μm.

Onto the resulting layer, the fluorescent material forming coating composition was uniformly coated at a layer thickness of 240 μm, employing a doctor blade, and dried. Thereafter, the resulting coating was compressed at a pressure of 800 kgw/cm² employing a calender roll.

Furthermore, a transparent protective, layer with a thickness of 3 μm, was formed employing a method described in Example 1 of Japanese Patent Publication Open to Public Inspection No. 6-75097 and a fluorescent screen was prepared, which is composed of a support, a subbing layer, a fluorescent material layer, and a transparent protective layer.

<Evaluation>

Sensitivity and pressure resistance of each of the prepared Samples were evaluated as described below.

(Sensitivity)

Each Sample was placed between the prepared fluorescent screen; subjected to X-ray irradiation via a Penetrometer B Type manufactured by Konica Medical Co., Ltd., and subjected to processing at a development temperature of 35° C. for 45 seconds, from dry to dry, employing a SR-DF processing solutions manufactured by Konica Corp. in an Automatic Processor SRX-503 manufactured by Konica Corp. At the time, the reciprocal of the X-ray irradiation amount to yield a density of fog +0.1 was denoted as the sensitivity and relative sensitivity was evaluated when the sensitivity of Sample No. 1 was 100.

<Evaluation on In-solution Pressure Resistance>

In a dark room, a Sample was wound at 1800 to a smooth surface rubber roller b while the B surface of the Sample was placed inside and the A surface of the Sample was pressed at an optional pressure employing a rubber roller having an intentionally roughened surface, and the Sample was passed between the rollers once. Thereafter, the resulting Sample was subjected to development processing and the degree of the pressure fog generated was visually evaluated. The pressure applied to the roller was previously adjusted so that the scale of the pressure fog of Comparative Sample 1 was 3.

Regarding the scale of pressure fog, the larger the number, the less pressure fog is formed, and a value of 5 denotes no pressure fog.

Table 2 shows the obtained results on Samples No. 1 through No. 19. In the table, E represents an emulsion layer and Pro represents a protective layer.

TABLE 2

| | | Latex Type | Added Layer | Added Amount (g/m$^2$) | Relative Sensitivity | In-solution Pressure Resistance |
|---|---|---|---|---|---|---|
| 1 | (Comparative Example) | Latex L | Em<br>Pro | 0.2<br>0.1 | 100 | 3 |
| 2 | (Present Invention) | A | Em<br>Pro | 0.2<br>0.1 | 135 | 5 |
| 3 | (Present Invention) | B | Em | 0.2 | 120 | 5 |
| 4 | (Present Invention) | C | Pro | 0.1 | 120 | 4 |
| 5 | (Present Invention) | D | Pro | 0.1 | 115 | 4 |
| 6 | (Present Invention) | E | Em<br>Pro | 0.2<br>0.1 | 130 | 5 |
| 7 | (Present Invention) | A<br>F | Em<br>Pro | 0.1<br>0.1 | 125 | 4 |
| 8 | (Present Invention) | G<br>A | Em<br>Pro | 0.2<br>0.2 | 130 | 5 |
| 9 | (Present Invention) | B | Em | 0.025 | 110 | 4 |
| 10 | (Comparative Example) | a<br>b | Em<br>Pro | 0.5<br>0.5 | 110 | 3 |
| 11 | (Comparative Example) | d<br>b | Em<br>Pro | 0.4<br>0.4 | 105 | 3 |
| 12 | (Comparative Example) | c<br>d | Em<br>Pro | 0.2<br>0.1 | 105 | 3 |
| 13 | (Comparative Example) | c<br>b | Em<br>Pro | 0.2<br>0.2 | 105 | 3 |
| 14 | (Comparative Example) | d<br>c | Em<br>Pro | 0.025<br>0.025 | 100 | 3 |

Em and Pro denote emulsion layer and protective layer, respectively.

Based on Table 2, the following is found.

Samples No. 2 through No. 9 of the present invention exhibit improvements in relative sensitivity and in-solution pressure resistance.

Further, Samples No. 2 through No. 14 comprising the latex of the present invention were found to exhibit no degradation of transparency after development processing, compared to Comparative Samples.

Example 2

| (Preparation of Emulsion EM-3) | |
|---|---|
| (A3 Composition) | |
| Ossein gelatin | 37.5 g |
| Potassium iodide | 0.625 g |
| Sodium chloride | 16.5 g |
| Distilled water to make | 7500 ml |
| (B3 Composition) | |
| Silver nitrate | 1500 g |
| Distilled water to make | 2500 ml |
| (C3 Composition) | |
| Potassium iodide | 4 g |
| Sodium chloride | 140 g |
| Distilled water to make | 684 ml |
| (D3 Composition) | |
| Sodium chloride | 375 g |
| Distilled water to make | 1816 ml |

A3 Composition was placed in a mix-stirring machine described in Japanese Patent Publication 58-58288 and added at 40° C. with 684 ml of B3 Composition and the total of C3 Composition for 1 minute. While maintaining silver potential $E_{Ag}$ at 149 mV, Ostwald ripening was carried out for 20 minutes. Thereafter, All the residual B3 Composition and all the D3 Composition were added over 40 minutes. Thereafter, salt removal was immediately carried out followed by washing to prepare seed emulsion EM-3.

The resulting silver halide seed emulsion was observed employing an electron microscope and was found that not less than 60% of the total projection area of the silver halide grains is composed of tabular grains having a (100) plane as a main plane, which have an average thickness of 0.07 μm, an average diameter corresponding to a circle of 0.5 μm, and a variation coefficient (standard deviation of grain diameter distribution ×100/average grain diameter) of 25%.

<Preparation of High Silver Chloride Content Emulsion EM-4>

Employing Emulsion EM-3 as a seed emulsion, Emulsion EM-4 was prepared which was composed of tabular grains of high silver chloride content.

| (A4 Composition) | |
|---|---|
| Ossein gelatin | 29.4 g |
| HO(CH$_2$CH$_2$O)$_n$[CH(CH$_3$)CH$_2$O]$_{17}$(CH$_2$CH$_2$O)$_m$H<br>(n + m = 5 to 7) 10% methanol solution | 1.25 ml |
| EM-3 | equivalent to 0.98 mole |
| Water to make | 3000 ml |
| (B4 Composition) | |
| 3.5 N aqueous silver nitrate solution | 2240 ml |
| (C4 Composition) | |
| Sodium chloride | 455 g |
| Distilled water to make | 2240 ml |
| (D4 Composition) | |
| Aqueous 1.75 N sodium chloride solution<br>amount to control silver potential | |

In the above-mentioned mix-stirring machine, A4 Composition was put and at 40° C., grain growth was carried out in such a manner that all B4 Composition and all C4

Composition were added to the resulting composition for 110 minutes employing a double-jet method so that the flow rate at addition completion became three times as large as the addition commencement.

During that time, the silver potential was adjusted to +120 mV employing D4 Composition.

After addition completion, in order to remove excessive salts, coagulation salt removal was carried out in accordance with the method described below.

1. The resulting composition subjected to mixing was maintained at 40° C., and gelatin coagulant G-3 described in the example of Japanese Patent Publication Open to Public Inspection No. 2-7037 was added in an amount of 20 g per mole of silver halide, and the pH was lowered to 4.30 with the addition of 56 weight percent of acetic acid. After resting the resulting composition, decantation was carried out.
2. Per mole of silver halide, 1.8 liters of deionized water at 40° C. was added and after resting, the resulting composition was subjected to decantation.
3. The above-mentioned process 2 was again carried out.
4. Per mole of silver halide, 15 g of gelatin, sodium carbonate, and water were added and the pH was adjusted to 6.0 followed by redispersion to make 450 ml per mole of silver halide.

Approximately 3,000 silver halide grains contained in the resulting Emulsion EM-4 were observed employing an electron microscope and was found that 80% of the entire projection area were composed of tabular silver halide grains having a (100) plane as a main plane and an average diameter corresponding to a circle of 1.17 μm and an average thickness of 0.12 μm.

The resulting Emulsion EM-4 was maintained at 55° C. and after the addition of 5 milli moles of a fine silver iodide grain emulsion (average grain diameter of 0.05 μm), and 250 mg of spectral sensitizing dye (1) and 30 mg of spectral sensitizing dye (2), which were dispersed in the form of fine particles, 2.0 mg of ammonium thiocyanate, 1.0 mg of chloroauric acid, and 1.0 mg of triphenylphosphine selenide were added and the resulting mixture underwent ripening for total 90 minutes. At the end of ripening, 50 mg of TAI was added as a stabilizer to prepare an emulsion.

Spectral sensitizing dye (1)

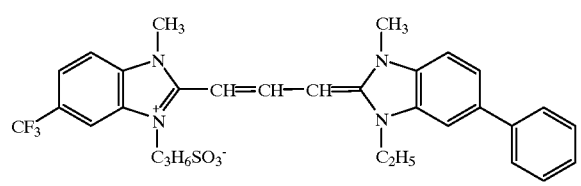

Spectral sensitizing dye (2)

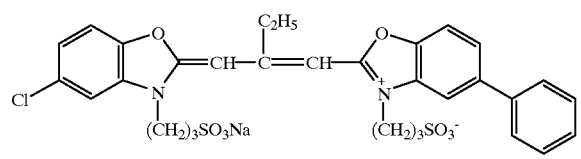

<Preparation of Sample>

Sample No. 20 was prepared in the same manner as in Sample No. 1, except that the silver halide emulsion was replaced with EM-4. In Sample No. 20, and Samples No. 21 through No. 31 in which latex was added to emulsion layers on both sides was prepared as shown in Table 3.

<Evaluation on Abrasion and Pressure Resistance>

An unexposed Sample was placed on a plane stand; on the Sample, the surface of a sponge cleaner covered on a plate was placed so as to be in contact with the light-sensitive material; and a 300 g weight was placed on it. Thereafter, the light-sensitive material was pulled out between the plane stand and the sponge cleaner.

The resulting Sample was subjected development process and the degree of fog formation was evaluated according to 5-scale standard.
5: no fog is caused
4: slight fog is partially caused
3: slight fog is wholly caused
2: fog is wholly caused and partial heavy fog is caused
1: heavy fog is wholly caused Table 3 shows the obtained results regarding Samples No. 20 through No. 33.

TABLE 3

| | | Latex Type | Added Layer | Added Amount (g/m²) | Relative Sensitivity | In-solution Pressure Resistance |
|---|---|---|---|---|---|---|
| 20 | (Comparative Example) | Latex L | Em Pro | 0.2 0.1 | 100 | 3 |
| 21 | (Present Invention) | A | Em Pro | 0.2 0.1 | 135 | 5 |
| 22 | (Present Invention) | B | Em | 0.2 | 120 | 5 |
| 23 | (Present Invention) | E | Pro | 0.2 | 120 | 4 |
| 24 | (Present Invention) | F | Pro | 0.2 | 125 | 4 |
| 25 | (Present Invention) | G | Em Pro | 0.2 0.1 | 130 | 5 |
| 26 | (Present Invention) | D C | Em Pro | 0.5 0.5 | 135 | 5 |
| 27 | (Comparative Example) | a | Em Pro | 0.2 0.1 | 110 | 3 |
| 28 | (Comparative Example) | b | Em Pro | 0.2 0.1 | 105 | 3 |
| 29 | (Comparative Example) | c | Em Pro | 0.2 0.1 | 105 | 3 |
| 30 | (Comparative Example) | a d | Em Pro | 0.05 0.05 | 100 | 3 |
| 31 | (Comparative Example) | b | Em Pro | 0.5 0.5 | 100 | 3 |

Table 3 reveals the following.

Samples No. 21 through 26 of the present invention, in which the weight ratio of the latex having an active methylene group to the latex having an active methylene group, prepared by polymerization in the presence of a hydrophilic polymer comprising isoprene sulfonic acid or salts thereof as a monomer unit exhibit improvements in relative sensitivity, and abrasion and pressure resistance, compared to Comparative Examples No. 20, and No. 27 through No. 31.

Further, Samples No. 21 through 26 comprising the latex of the present invention result in no decrease in transparency, compared to Comparative Samples No. 20, and No. 27 through No. 31.

As specifically proved in Examples, the latex of the present invention and the sheet material using the same exhibit excellent physical properties (in-solution pressure resistance, abrasion resistance, transparency) of layers and result in excellent effects.

What is claimed is:

1. A latex which is prepared by polymerizing a polymerizable monomer having an active methylene group in the presence of a hydrophilic polymer comprising isoprene sulfonic acid or salts thereof;

wherein the active methylene monomer is represented by the formula (1);

formula (1)

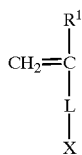

wherein $R^1$ represents a hydrogen atom, an alkyl group having from 1 to 4 carbon atoms, or a halogen atom; L represents a single bond or divalent linkage group;

wherein X is $R^8$—CO—$CH_2$—COO—, NC—$CH_2$—COO—, $R^8$—CO—$CH_2$—CO— or $R^8$—CO—$CH_2$—CON($R^5$)—; wherein $R^5$ is a hydrogen atom, or an alkyl group having from 1 to 6 carbon atoms; $R^8$ represents a substituted or unsubstituted alkyl group, a substituted or unsubstituted aryl group, an alkoxy group, a cycloalkyloxy group, an aryloxy group, an amino group, or a substituted amino group.

2. The latex of claim 1 wherein $R^1$ represents a hydrogen atom, a methyl group, an ethyl group, a n-propyl group, a n-butyl group, a chlorine atom, or a bromine atom.

3. The latex of claim 2 wherein $R^1$ represents a hydrogen atom or a methyl group.

4. The latex of claim 1 wherein the hydrophilic polymer comprising isoprene sulfonic acid or salts thereof contains isoprene sulfonic acid or salts thereof in an amount not less than 30 molar %.

5. The latex of claim 4 wherein the hydrophilic polymer comprising isoprene sulfonic acid or salts thereof contains isoprene sulfonic acid or salts thereof in an amount not less than 50 molar %.

6. A sheet material comprising
a support, and
at least one hydrophilic colloidal layer positioned on said support, said layer comprising a dried coating composition containing the latex as claimed in claim 1.

7. A sheet material of claim 6 wherein the solid portion of the latex is 1 to 50 percent in terms of weight ratio for the whole hydrophilic colloidal layer.

8. A sheet material of claim 7 wherein the solid portion of the latex is 1 to 40 percent in terms of weight ratio for the whole hydrophilic colloidal layer.

9. The latex of claim 1 wherein the weight average molecular weight of the hydrophilic polymer is 3,000 to 200,000.

10. The latex of claim 9 wherein the weight average molecular weight of the hydrophilic polymer is 10,000 to 100,000.

11. The latex of claim 1 wherein $R^1$ represents a hydrogen atom, a methyl group or a chlorine atom.

12. The latex of claim 1 wherein L represents —($L_1$)$_m$—($L_2$)$_n$— wherein $L_1$ represents
—CON($R_2$)—, —COO—, —NHCO—, —OCO—,

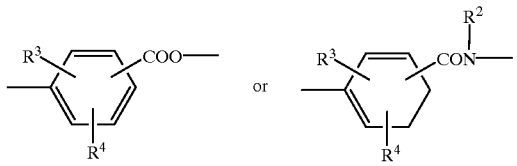

wherein $R_2$ represents a hydrogen atom, an alkyl group having from 1 to 4 carbon atoms, or a substituted alkyl group having from 1 to 6 carbon atoms; $R_3$ and $R_4$ each independently represents a hydrogen atom, a hydroxyl group, a substituted or unsubstituted alkyl group, alkoxy group or aryloxy group;

$L_2$ represents a linkage group to link $L_1$ with X; and m or n represents 0 or 1.

13. The latex of claim 1 wherein the monomer having an active methylene group is polymerized in the presence of the hydrophilic polymer, wherein the hydrophilic polymer is present in an amount of 0.5 to 20 weight parts to 100 parts of the monomer having an active methylene group.

14. The latex of claim 11 wherein the weight average molecular weight of the hydrophilic copolymer is 10,000 to 100,000 and wherein the monomer having an active methylene group is polymerized in the presence of the hydrophilic polymer, and the hydrophilic polymer is present in an amount of 0.5 to 20 weight parts to 100 parts of the monomer having an active methylene group.

* * * * *